Patented Aug. 10, 1943

2,326,496

UNITED STATES PATENT OFFICE 2,326,496

MINERAL OIL COMPOSITION AND IMPROVING AGENT THEREFOR

Orland M. Reiff, Woodbury, N. J., assignor to Socony-Vacuum Oil Company, Incorporated, New York, N. Y., a corporation of New York No Drawing. Application April 20, 1940, Serial No. 330,693

13 Claims. (Cl. 252—48)

This invention has to do in a general way with mineral oil compositions and is more particularly related to mineral oil compositions of the lubricant type to which an agent has been added in a minor proportion for the purpose of improving the oil in certain respects. It is an object of this invention to provide a novel class of mineral oil addition agents which will improve one or more important properties of a mineral oil fraction. It is a further object to provide mineral oil compositions containing such improving agents.

In copending application Serial No. 226,911 (Patent 2,198,293), filed August 26, 1938, in which I am a coinventor, there are described as mineral oil addition agents a general class of alkyl-substituted aryl ether acids which are characterized by the presence of a wax- (or heavy alkyl-) substituted aryl nucleus, such addition agents being multifunctional in that they are effective to reduce the pour point and improve the viscosity index of the oil to which they are added. The present invention is predicated upon the discovery that the sulfur derivatives or, more specifically, the sulfides (monosulfides and polysulfides) of alkyl-substituted aryl ether acids of the type disclosed in the aforesaid application are improved in certain respects over the corresponding alkylated aryl ether acids from which such sulfides are obtained. In addition to the sulfides or sulfur derivatives my invention also contemplates the corresponding derivatives of the related elements, selenium and tellurium.

More specifically, the present invention is concerned with condensation compounds of sulfur, selenium, or tellurium corresponding in general to the alkyl-substituted aryl ether acids disclosed in the aforesaid copending application. The addition agents of the present invention, like those of this last-mentioned copending application, are characterized by the presence of an aromatic nucleus in which at least one nuclear hydrogen atom is substituted with an oil-solubilizing alkyl group or groups and wherein at least one other nuclear hydrogen atom is substituted with an ether acid group.

The addition agents of the present application are distinguished from those of the aforesaid application in that at least two of the alkylated aryl ether acid groups are interconnected by at least one atom of an element selected from the group consisting of sulfur, selenium, and tellurium. Through the introduction of sulfur, for example, in the manner or manners to be hereinafter described, I obtain what may be broadly termed a sulfide of an alkyl-substituted aryl ether carboxylic acid.

This general class of sulfides of alkyl-substituted aryl ether acids distinguishes over the corresponding alkylated aryl ether acids disclosed in the aforesaid application in that the sulfides possess the property of retarding the deleterious effects of oxidation in the oil to which they are added. In the preferred multifunctional class of the addition agents contemplated herein I have found that the sulfides, in general, possess improved pour depressant and viscosity index improving properties in addition to the antioxidant properties just referred to. The improved antioxidant properties are particularly significant in retarding the development of acidity in certain types of oils and under certain conditions of use.

The property of oil-miscibility—that is, of remaining uniformly suspended in the oil under normal conditions of handling and use—is imparted to the condensation products contemplated herein by the alkyl substituent on the characterizing aryl nucleus. This substituent, therefore, should be derived from an aliphatic hydrocarbon of sufficient solubilizing value to render the condensation product oil-miscible. For obtaining the preferred product having multifunctional properties, the alkyl substituent should correspond to an aliphatic hydrocarbon having at least twenty carbon atoms or should be derived from an aliphatic material or mixture of aliphatic compounds predominantly comprised of compounds having at least twenty carbon atoms. A petroleum wax such as paraffin wax constitutes a preferred source for these so-called heavy alkyl substituents of the latter type and for that reason the preferred multifunctional compounds may be hereinafter designated as "wax"-substituted. It is to be understood, however, that the term "wax" as used in this regard is not restricted to substituent groups derived from petroleum wax but is intended to include substituent groups derived from any aliphatic hydrocarbon or mixture thereof or any predominantly aliphatic material which is in character or constituents similar to the constituents of petroleum wax.

The condensation products of alkyl-substituted aryl ether acids of the type contemplated herein may be characterized by the general formula:

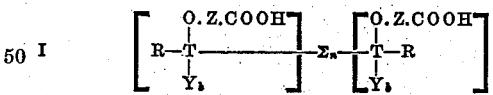

in which T represents a monocyclic or polycyclic aromatic nucleus; $\Sigma$ represents sulfur, selenium, or tellurium; and $n$ represents a whole number from one to four. The group O.Z.COOH represents what I may term an ether carboxylic acid group wherein Z represents an aliphatic, alicyclic, or aromatic group. R represents at least one oil-solubilizing alkyl group, which for the preferred multifunctional condensation products is at least one alkyl group having at least twenty carbon atoms hereinabove identified as a "wax" group. In addition to the oil-solubilizing alkyl group (R), the characterizing aryl nucleus may contain residual hydrogen, a part or all of which may in turn be substituted with substituents having a positive or negative or neutral oil-solubilizing effect. Such residual hydrogen or substituents are indicated by $Y_b$ in the general formula, wherein Y may be defined as selected from the group consisting of hydrogen, hydroxyl, ester (organic or inorganic acyl group), keto, alkoxy, alkyl sulfide, aryl sulfide, aroxy, ether alcohol, aldehyde, thioaldehyde, oxime, amido (organic or inorganic acyl group), thioamido, carbamido, aralkyl, aryl, alkaryl, halogen, nitroso, amino, nitrosamino, amidino, imino, N-thio, diazo, hydrazino, cyano, azoxy, azo, and hydrazo radicals; and $b$ represents the number of Y's and is equal to zero or a whole number corresponding to available hydrogens on the nucleus T not substituted with R, O.Z.COOH and $\Sigma_n$.

As aforesaid, Z may be an aromatic nucleus, and in that event this aryl nucleus may have R and Y substituents and the condensation with the linkage $\Sigma_n$ may take place between the aryl nucleus or nuclei of such a Z group. The foregoing general formula is intended to include such modified derivatives. When Z is aliphatic, the Y type of substituents may also be present, excepting those of strictly aromatic origin, such as those resulting from diazotization, for instance.

As aforesaid, the aryl nucleus T may be mono- or poly-cyclic, corresponding, for example, to phenol, naphthol, anthrol, and their derivatives. A typical condensation product in which the alkylated aryl ether acid groups are derived from alkylated phenol may, in its simplest form, be represented by the general formula:

II

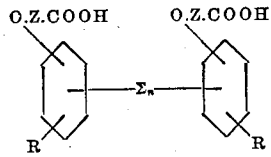

Since the condensation reaction employed in synthesizing the sulfides (or corresponding selenides or tellurides) may be attended by further condensation, such further condensed products (hereinafter termed "polymers") are contemplated herein as coming within the general Formula I and the terms "sulfides," "condensation products," etc., as used herein to identify these oil addition agents. Polymers of this character which may be associated with or formed instead of the simple condensation product of Formula II may be represented by the following formula:

III

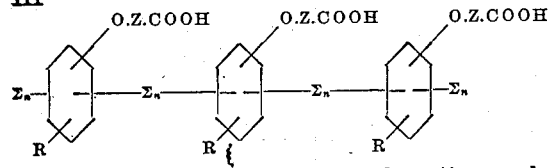

Also, where synthesis of the condensation product employs as an initial reactant a wax-substituted phenol obtained by the Friedel-Crafts condensation of phenol with a halogenated aliphatic compound containing at least twenty carbon atoms or a mixture, such as petroleum wax, predominantly comprised of such high molecular weight aliphatic hydrocarbons, this condensation may result in the formation of a "wax-phenol" in which two or more phenol groups are interconnected by one or more aliphatic hydrocarbon chains. Compounds of this type, when converted to the aryl ether acids and further reacted to form the sulfides of aryl ether acids, may result in the formation of condensation products corresponding to the formula

IV

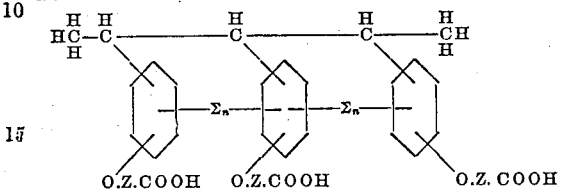

or compounds of the formula

V

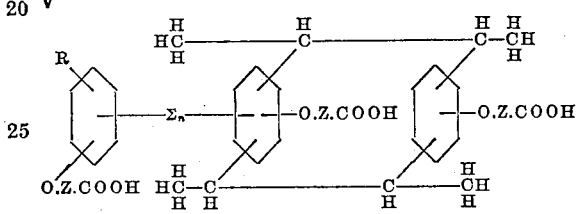

in which the chains represent the aliphatic hydrocarbon group R of general Formula I.

The foregoing discussion pertaining to Formulae II to V is not intended as a development of the specific molecular composition or structure of condensation products constituting the mineral oil addition agents contemplated herein but is merely intended as indicative of the possible composition of such addition agents. These addition agents may be broadly characterized as the sulfides (or the corresponding selenides or tellurides) of alkylated aryl ether carboxylic acids. The sulfur condensation products may also be characterized as alkylated-aroxy aliphatic carboxylic acid sulfides and alkylated-aroxy aromatic carboxylic acid sulfides.

As aforesaid, the term "sulfide" as used herein is inclusive of the monosulfides, disulfides, trisulfides, tetrasulfides, etc.—that is, it includes both monosulfides and polysulfides—and it is also intended to include such polymers and related derivatives as may be formed by the hereinafter described procedures employed to illustrate the synthesis of the addition agents contemplated herein. It is also pointed out that the so-called polymer products typified by Formulae III to V are included under general Formula I since they are characterized by having therein at least one grouping typified by general Formula I.

The sulfur derivatives or sulfides of the alkylated aryl ether acids are the preferred class of condensation products contemplated herein, and for that reason the invention will be specifically described in connection with these derivatives although, as aforesaid, the corresponding selenides and tellurides are contemplated as coming within the scope of the broad inventive concept.

One general procedure for synthesizing the sulfides of alkylated aryl ether acids is to react the corresponding alkylated aryl ether acid with a sulfur halide. Another procedure of this type involves condensation of the alkali metal carboxylates of the alkylated aryl ether acids with a sulfur halide, whereby sulfides of alkylated aryl ether acids of lighter color may be obtained.

Another desirable procedure consists in conversion of a wax-phenol or wax-alkali phenate to the wax-hydroxy-aryl sulfide, followed by introduction of the ether acid group. When Z is aromatic, however, the preceding procedures are preferred.

In the event sulfur dichloride (SCl₂) is used in the general procedure described above, the condensation product will be in the nature of a monosulfide (or polymer thereof); sulfur monochloride will yield the corresponding disulfide (or polymer thereof), and of course, a mixture of sulfur halides may be employed to obtain a mixture of sulfides. Elementary sulfur may be employed as the condensation reagent, but this is not considered the most desirable procedure.

Sulfur derivatives of higher sulfur content may be obtained by reacting a condensation product having the disulfide linkage with sulfur or with alkali polysulfides or with an alkyl tetrasulfide. Such higher sulfur derivatives may also be obtained by first reducing the disulfide to form a thio-phenol or aryl mercaptan of the alkylated aryl ether acid and then reacting the aryl mercaptan derivative with sulfur dichloride (to form the trisulfide) or with sulfur monochloride (to form the tetrasulfide).

The alkylated aryl ether acids and their alkali metal salts used in preparing the sulfides may be obtained in various ways. The details in desirable procedures for preparing the alkylated aryl ether acids are described in the aforesaid copending application 226,911. A typical procedure for forming the alkali carboxylates and the corresponding alkylated aryl ether acids involves the following steps.

(1) A hydroxyaromatic compound such as phenol is reacted with a halogenated high molecular weight aliphatic hydrocarbon, or a mixture predominantly comprised of these high molecular weight aliphatic compounds such as chlorinated petroleum wax, in the presence of a Friedel-Crafts catalyst such as anhydrous aluminum chloride. The wax may be chlorinated to a chlorine content of from about 10 per cent to about 20 per cent, and the ratio of chlorinated wax to phenol in the reaction mixture, may, for example, be such that there are three atomic proportions of chlorine present in chlorwax of 16 per cent chlorine content to one molecular proportion of phenol. The reaction is carried out at elevated temperature, preferably not to exceed 350° F., and the product purified to remove unreacted phenol. A wax-substituted phenol obtained with a reaction mixture using 3 atomic proportions of chlorine of 16 per cent chlorine content to one mol of phenol is designated as wax-phenol (3—16) and the ultimate products obtained therefrom may be characterized with a similar expression, the first numeral (3) in the parenthesis indicating the ratio of chlorine (atomic proportions) to one mol of phenol in the reaction mixture and the second numeral (16) indicating the chlorine content of the chlorinated wax.

(2) An alkylated phenol of the type obtained according to the foregoing step is converted to the corresponding wax-substituted alkali metal phenate by a suitable procedure such as by reaction with metallic sodium (or potassium) at elevated temperature, in the neighborhood of 500° F., in the presence of a non-oxidizing gas. The mixture should be rapidly stirred to produce finely divided sodium and thereby accelerate the reaction. The proportions of the reactants should be such that there is sufficient sodium present to substitute the hydroxyl hydrogen.

The alkylated alkali metal phenate can be prepared more conveniently, however, by reaction of the alkylated phenol with sodium alcoholate, such as sodium butylate, by heating the mixture to about 300° F. and allowing the alcohol to distill.

(3) The alkylated aryl metal oxide or wax-alkali phenate obtained by the foregoing step may be converted to a wax-phenoxy aliphatic acid alkali metal salt by reaction of the phenate with the alkali salt of a chlor (mono- or polybasic) aliphatic acid. Alkali salts of diaryl ether acids (wax-aroxy aromatic acid alkali metal salts) can be obtained by reacting the wax-alkali phenate with a brom-aryl alkali carboxylate in the presence of a small percentage of powdered copper as a catalyst, the reaction mixture being heated to a temperature in the neighborhood of 400° F. The alkali metal salts of the alkylated aryl ether acids can be converted to the corresponding acids by acidifying with a mineral acid such as HCl.

When it is desired to obtain a compound or condensation product in which the characterizing aryl nucleus contains, in addition to or instead of residual hydrogen, a substituent of the type classified in general Formula I as $Y_b$, it is pointed out that with the exception of substituents such as aralkyl, aryl, alkaryl, halogen, hydroxyl, and aroxy, such Y groups are introduced after alkylation (step 1 above) and generally before introduction of the ether acid group. The usual methods for introduction of these substituents into non-alkylated hydroxyaromatic compounds may be employed in connection with the alkylated or wax-substituted hydroxyaromatic compounds obtained in step 1. To those skilled in the art it will be apparent that the Y substituents are mainly derivatives of phenolic (—OH) groups, amino groups, aldehyde and keto groups, and carboxyl groups. Methods for the introduction of such base substituents along with —Z.COOH groups will be apparent from methods described in the aforesaid copending application.

The foregoing is merely a general description of a typical procedure which may be employed to obtain an initial reactant for making the sulfides of alkylated aryl ether acids. Other desirable procedures and further details may be obtained from the aforesaid copending application.

Examples of the hydroxyaromatic compounds which may be used as the starting material in step 1 are: phenol, resorcinol, hydroquinone, catechol, cresol, xylenol, hydroxy-diphenyl, benzylphenol, phenyl-ethyl-phenol, phenol resins, methyl-hydroxydiphenyl, alpha and beta naphthol, tolyl naphthol, anthrol and the like, with special preference given to phenol (hydroxybenzene) and alpha and beta naphthol. The chloraliphatic material employed in step one should contain, or should be predominantly comprised of compounds containing, at least twenty carbon atoms to obtain the preferred multi-functional products. A chlorinated petroleum wax such as paraffin wax having a melting point not substantially less than about 120° F. is a preferred material to use in this reaction. These chlorinated aliphatic reactants may, however, be pure high molecular weight compounds capable of imparting oil-miscibility to the product, but preference is given to mixed high molecular weight hydrocarbons typified by those which characterize the heavier products of petroleum such as heavy petroleum oils of the lubricant type, petrolatum and crystalline petroleum wax or other predominantly aliphatic materials which will result in relatively long chain aliphatic substituents.

As an alternative procedure for effecting alkylation of the aryl nucleus I may employ unsaturated aliphatic hydrocarbons, preferably of high molecular weight, such as eicosylene, cerotene, melene, etc., using $H_2SO_4$, $BF_3$ or $AlCl_3$ as a catalyst. Other sources for the heavy alkyl substituents are higher alcohols, preferably of at least 20 carbon chain lengths, such as ceryl alcohol, myricyl alcohol, etc. High molecular weight alcohols can be condensed with phenols directly in the presence of $H_2SO_4$ or $AlCl_3$ as a catalyst, but it is preferred to convert the alcohol to the corresponding halide (or polyhalide) and then condense the same with the hydroxyaromatic compound by the Friedel-Crafts reaction.

Examples of halogenated organic acids which may be used (as their alkali metal salts) in the formation of aryl ether acid derivatives are the halogenated monobasic aliphatic acids such as acetic, butyric, octoic, palmitic, stearic, naphthenic, etc.; polybasic acids such as maleic, succinic, adipic, etc.; and aromatic acids such as benzoic, phthalic, cinnamic, furoic, etc. Both aliphatic and aromatic acids may also carry substituents such, for example, as keto, nitro, amino, hydroxy groups and the like.

The sulfides of the alkylated aryl ether acids are obtained by dissolving the alkylated aryl ether acid in a suitable solvent such as carbon disulfide, benzene, chlorbenzene, ethylene dichloride, Stoddard Solvent or the like. The temperature of the solution may be brought up to about 100° F. and the sulfur halide or mixture of sulfur halides added in the ratio of from about ½ to 1 mol of sulfur halide per mol of the acid. The addition of the sulfur halide should be sufficiently slow to prevent the temperature substantially exceeding 100° F. and the mixture may be held at that temperature for about one hour to complete the formation of the sulfur derivative. Hydrogen chloride is evolved in the reaction, resulting in fixation of the sulfur in the aryl nucleus. As regards the temperature of the reaction, it is to be understood that the reaction can be carried out at various temperatures from room temperature up to the boiling point of the solvent, but it is preferable for obtaining light-colored products that the temperature be not too high. The mixture is water-washed to remove dissolved hydrochloric acid.

When the alkylated aryl ether acid starting material for sulfur condensation is obtained as the alkali carboxylate or alkali metal salt, the corresponding sulfide derivatives can be obtained by reacting with sulfur halide without first liberating the free acid and in this case free HCl is not evolved unless an amount of sulfur halide in excess of the sodium content is used, the HCl being converted to sodium chloride by reaction with the carboxylate alkali, thereby liberating the free alkylated aryl ether acid. When the alkali salt is used as an initial reactant, the procedure is in general the same as that described above except that solvents such as carbon disulfide and ethylene dichloride must be replaced with solvents such as alcohol, benzene, or chlorbenzene to avoid side reactions with the alkali derivative.

Further details in typical procedures which may be followed in synthesizing the oil-improving agents contemplated by the invention will appear from the following examples.

EXAMPLE ONE

WAX-PHENOXY ACETIC ACID DISULFIDE

A solution of 127.5 grams of monochloracetic acid in 100 cc. of anhydrous ethanol was converted to sodium chloracetate by adding thereto a standard alcohol solution of sodium hydroxide, maintaining the temperature of the reaction mixture at about 100° F. This sodium chloracetate mixture was then added to a solution of 200 grams of wax-sodium phenate (3—16) in 600 grams of mineral oil (oil of Say. vis. of 67 sec. at 210° F.), and the mixture was stirred at 150° F. during a 2-hour period to form the wax-substituted phenoxy sodium acetate. The mixture was then sulfurized by lowering the temperature to about 100° F. and adding with rapid stirring 19.7 grams of sulfur monochloride at a rate sufficiently slow to avoid appreciable rise in temperature of the mixture by the heat of reaction developed. The mixture was then stirred at this temperature about one hour to complete the sulfurization, followed by distilling the alcohol and water-washing the mixture until the aqueous extract was neutral. All traces of alcohol and water were then removed by steam-treating the mixture at about 300° F. to obtain the finished product, which was approximately a ¼ blend in mineral oil.

EXAMPLE TWO

WAX-PHENOXY BENZOIC ACID DISULFIDE

A solution of 100 grams of wax-sodium phenate in 300 grams of mineral oil (oil of Say. vis. of 67 sec. at 210° F.) was mixed with 29 grams of brom sodium benzoate and stirred at a reaction temperature of about 400° F. during a 4-hour period in the presence of copper powder as catalyst to form the sodium salt of wax-phenoxy benzoic acid. The free acid was obtained by treating the reaction product with aqueous hydrochloric acid, followed by water-washing and drying the mixture to obtain the purified product. The free acid was then diluted with one volume of chlorbenzene and neutralized by adding one equivalent of sodium butylate and heating to about 200° F. for one hour before sulfurizing. The sulfurization was carried out by adding 9.8 grams of sulfur monochloride at 100° F. at rate sufficiently slow to avoid appreciable temperature rise by the heat of reaction, and stirring one hour at this temperature to complete the sulfurization, whereby the wax-phenoxy benzoic acid disulfide was formed. The product was purified by water-washing the mixture until the aqueous extract was neutral, followed by distilling the chlorbenzene diluent to obtain the finished product, which was approximately a ¼ blend in mineral oil.

To demonstrate the improved properties obtained in mineral oil blends containing addition agents of the type discussed herein, I have conducted several comparative tests with representative mineral oils alone and with the same oils blended with representative alkylated aryl ether acid sulfides. The results of such tests are discussed in the following examples.

EXAMPLE A

POUR POINT DEPRESSION

These tests were conducted with a motor oil having a Saybolt viscosity of 67 seconds at 210° F. and a pour point of +20° F. The pour points of blends formed from this oil and representative wax-substituted aryl ether acid sulfides or sulfides of alkylated aryl ether acids are listed in Table I below, from which it will be observed that the addition agents contemplated herein are effective pour point depressants when the aryl nucleus is substituted with petroleum wax.

Table I

| Addition agent | A. S. T. M. pour point | | |
|---|---|---|---|
| | 0% depressant | 1/16% depressant | 1/8% depressant |
| | °F. | °F. | °F. |
| Wax-phenoxy acetic acid disulfide (3-16) | +20 | −10 | −20 |
| Wax-phenoxy benzoic acid disulfide (3-16) | +20 | −10 | −15 |

EXAMPLE B
VISCOSITY INDEX IMPROVEMENT

The data listed in Table II below showing the effectiveness of typical addition agents contemplated herein for improving viscosity index (V. I.) were obtained in the conventional manner from the Saybolt viscosity (Say. vis.) of the oil and the oil blends at 100° F. and 210° F. The oil used was a viscous mineral oil of the lubricant type.

Table II

| Addition agent | Conc. by wt. | Say. vis. | | V. I. |
|---|---|---|---|---|
| | | 100° F. | 210° F. | |
| | Per cent | | | |
| None | | 140.7 | 41.8 | 79.3 |
| Wax-phenoxy acetic acid disulfide (3-19) | 1 | 145.9 | 42.6 | 92.3 |
| None | | 140.5 | 41.7 | 74.5 |
| Wax-pehnoxy acetic acid disulfide (3-16) | 1 | 153.0 | 42.8 | 85.2 |
| Wax-phenoxy benzoic acid disulfide (3-16) | 1 | 150.9 | 42.6 | 83.1 |

EXAMPLE C
OXIDATION INHIBITION

In addition to the foregoing tests I have also made comparative tests between an oil and an oil blend containing representative improving agents of the type contemplated herein to determine the comparative behavior of the unblended oil and the improved oil under actual operating conditions. The tests were carried out in a single cylinder Lauson engine operated continuously over a time interval of 16 hours with the cooling medium held at a temperature of about 212° F. and the oil temperature held at about 280° F. The engine was operated at a speed of about 1830 R. P. M.

The oil used in the test was a lubricating oil stock of 45 seconds Saybolt viscosity at 210° F. and the conditions observed were:

a. The amount of naphtha insoluble material formed in the oil.
b. The neutralization number or acidity (N. N.) of the oil.
c. The S. U. V. of the oil before and after the test.

In running these tests, comparative runs were made with a sample of the blank oil and a sample of oil containing the addition agent. In Table III below the blank oil sample is indicated by A; and the oil with the addition agent used in the corresponding run is indicated by B. The oil blend B contained as addition agent:

½% wax-phenoxy acetic acid disulfide (3—16).

Table III

| Oil | S. U. V. at 210° F. | N. N. | Per cent naphtha insolubles |
|---|---|---|---|
| A | 50.5 | 5.1 | 0.17 |
| B | 46.9 | 1.1 | 0.10 |

The amount of improving agent used in the oil may be varied, depending upon the character of the oil with which it is blended and the properties desired in the final oil composition. The sulfides of alkylated aryl ether acids contemplated herein may be used in amounts ranging from $\frac{1}{16}$ per cent to 10 per cent, and in general mineral oil compositions of the desired improved properties may be obtained with amounts in the neighborhood of 1 per cent by weight.

It is to be understood that while I have described certain preferred procedures which may be followed in the preparation of the sulfides of alkylated aryl ether acids contemplated herein as oil-improving agents and have referred to various representative constituents of these improving agents, such procedures and constituents are for illustrative purposes only. The invention, therefore, is not to be considered as limited by the specific examples given but includes within its scope such changes and modifications as fairly come within the spirit of the appended claims.

I claim:

1. An improved mineral oil composition comprising a mineral oil having admixed therewith in minor proportion an oil miscible condensation product characterized by at least two aryl nuclei, each of which is substituted with at least one mineral-oil-solubilizing alkyl group and with at least one ether carboxylic acid group, the said characterizing nuclei being interconnected by at least one atom of an element selected from the group consisting of sulfur, selenium and tellurium.

2. An improved mineral oil composition comprising a mineral oil having admixed therewith in minor proportion an oil miscible condensation product characterized by at least two aryl nuclei, each of which is substituted with at least one alkyl group and with at least one ether carboxylic acid group, the said characterizing nuclei being interconnected by at least one atom of an element selected from the group consisting of sulfur, selenium and tellurium, the said alkyl substituents being aliphatic hydrocarbon groups of at least twenty carbon atoms.

3. An improved mineral oil composition comprising a mineral oil having admixed therewith in minor proportion an oil miscible condensation product characterized by at least two aryl nuclei, each of which is substituted with at least one alkyl group and with at least one ether carboxylic acid group, the said characterizing nuclei being interconnected by at least one atom of an element selected from the group consisting of sulfur, selenium and tellurium, the said alkyl substituents being the alkyl groups which characterize the aliphatic hydrocarbon compounds in petroleum wax.

4. An improved mineral oil composition comprising a mineral oil having admixed therewith in minor proportion an oil miscible condensation product characterized by at least two aryl nuclei, each of which is substituted with at least one mineral-oil-solubilizing alkyl group and with at least one ether carboxylic acid group, the said characterizing nuclei being interconnected by at least one atom of sulfur.

5. The composition of claim 4 in which the alkyl substituents correspond to the aliphatic hydrocarbon compounds which characterize petroleum wax.

6. The composition of claim 4 in which the alkyl substituents correspond to the aliphatic hydrocarbon compounds which characterize petroleum wax and in which the aryl nuclei are interconnected by a single atom of sulfur.

7. The composition of claim 4 in which the alkyl substituents correspond to the aliphatic hydrocarbon compounds which characterize petroleum wax and in which the aryl nuclei are interconnected by two atoms only of sulfur.

8. The composition of claim 4 in which the alkyl substituents correspond to the aliphatic hydrocarbon compounds which characterize petroleum wax and in which the ether carboxylic acid group is an ether aliphatic carboxylic acid group.

9. The composition of claim 4 in which the alkyl substituents correspond to the aliphatic hydrocarbon compounds of petroleum wax and in which the ether carboxylic acid group is an ether aromatic carboxylic acid group.

10. The composition of claim 4 in which the alkyl substituents correspond to the aliphatic hydrocarbon compounds which characterize petroleum wax and in which the aryl nuclei are phenyl nuclei and in which the ether carboxylic acid group is an ether acetic acid group and in which the phenyl nuclei are interconnected by two atoms only of sulfur.

11. The composition of claim 4 in which the alkyl substituents correspond to the aliphatic hydrocarbon compounds which characterize petroleum wax and in which the proportion of the oil miscible condensation product is from about $\frac{1}{10}$ per cent to about 10 per cent of the mineral oil.

12. An improved mineral oil composition comprising a mineral oil having admixed therewith a minor proportion of a condensation compound characterized by having at least once therein the grouping corresponding to the general formula

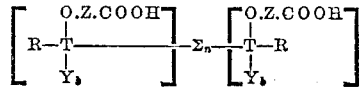

in which T represents an aromatic nucleus; R represents at least one oil-solubilizing alkyl group; O.Z.COOH represents an ether acid group wherein Z represents a radical selected from the group consisting of aliphatic, cycloaliphatic, and aromatic radicals; Y is selected from the group consisting of hydrogen, hydroxyl, ester, alkyl sulfide, aryl sulfide, keto, alkoxy, aroxy, ether alcohol, aldehyde, thioaldehyde, oxime, amido, thioamido, carbamido, aralkyl, halogen, nitroso, amino, nitrosamino, amidino, imino, N-thio, diazo, hydrozino, syano, azoxy, azo, and hydrazo radicals; $b$ represents the number of Y's and is equal to zero or a whole number corresponding to available hydrogens on the nucleus T not substituted with R, O.Z.COOH and $\Sigma_n$; $\Sigma$ represents an element selected from the group consisting of sulfur, selenium, and tellurium; and $n$ represents a whole number from one to four.

13. An improved mineral oil composition comprising a mineral oil having admixed therewith a minor proportion of a condensation compound characterized by having at least once therein the grouping corresponding to the general formula

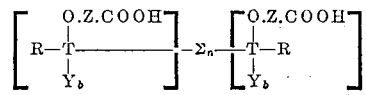

in which T represents an aromatic nucleus; R represents at least one alkyl group having at least twenty carbon atoms; O.Z.COOH represents an ether acid group wherein Z represents a radical selected from the group consisting of aliphatic, cycloaliphatic and aromatic radicals; Y is selected from the group consisting of hydrogen, hydroxyl, ester, keto, alkoxy, alkyl sulfide, aryl sulfide, aroxy, ether alcohol, aldehyde, thioaldehyde, oxime, amide, thioamido, carbamido, aralkyl, aryl, alkaryl, halogen, nitroso, amino, nitrosamino, amidino, imino, N-thio, diazo, hydrazino, cyano, azoxy, azo, and hydrazo radicals; $b$ represents the number of Y substituents and is equal to zero or a whole number corresponding to available hydrogens on the nucleus T not substituted with R, O.Z.COOH and $\Sigma_n$; $\Sigma$ represents an element selected from the group consisting of sulfur, selenium, and tellurium; and $n$ represents a whole number from one to four.

ORLAND M. REIFF.

2,326,496

CERTIFICATE OF CORRECTION.

Patent No. 2,326,496.　　　　　　　　　　　　　　　August 10, 1943.

ORLAND M. REIFF.

It is hereby certified that error appears in the printed specification of the above numbered patent requiring correction as follows: Page 4, second column, line 52, before the word "rate" insert --a--; page 5, second column, line 67, claim 3, before "in" insert --contained--; page 6, second column, line 12, claim 12, for "hydrozino, syano," read --hydrazino, cyano,--; and that the said Letters Patent should be read with this correction therein that the same may conform to the record of the case in the Patent Office.

Signed and sealed this 14th day of September, A. D. 1943.

(Seal)

Henry Van Arsdale,
Acting Commissioner of Patents.